UNITED STATES PATENT OFFICE.

EDWARD GOODRICH ACHESON, OF BUFFALO, NEW YORK.

ARTICLE OF CARBORUNDUM AND PROCESS OF THE MANUFACTURE THEREOF.

SPECIFICATION forming part of Letters Patent No. 615,648, dated December 6, 1898.

Application filed October 16, 1897. Serial No. 655,464. (Specimens.)

*To all whom it may concern:*

Be it known that I, EDWARD GOODRICH ACHESON, of Buffalo, in the county of Erie and State of New York, have invented a new and useful Improvement in Articles of Carborundum and the Manufacture Thereof, of which the following is a full, clear, and exact description.

I have discovered that when crystalline carborundum (carbid of silicon) is associated with iron, either in metallic state or as an oxid or salt and subjected to a high temperature, a chemical reaction occurs which does not seem to take place under similar conditions with amorphous carbid of silicon.

I have made a practical application of the above-described discovery to the manufacture of carborundum wheels, bricks, blocks, crucibles, &c., as follows: I take crystalline carborundum in grains of the desired size, moisten the same with a solution of sulfate of iron, preferably a saturated solution, and mold it under pressure in suitable forms or molds, the pressure being sufficient to force the particles together and to cause them to retain the desired form. The article so molded is then placed in a kiln and fired in the usual way. The effect of the heating of the article is to cause a reaction within the mingled body, resulting in a bond which holds the grains together in a firm hard mass. I believe that the reaction which takes place under these circumstances is as follows: Under the influence of the heat the sulfate of iron is decomposed, forming peroxid of iron on the surface of the grains of carborundum, and at a still higher temperature a chemical reaction takes place between the peroxid of iron and the carbid of silicon which results in the formation of a silicate of iron, which binds the grains together in an agglomerated mass.

For the purpose of obtaining a very strong bond in the manufacture of articles of carborundum I find it desirable to produce more silicate of iron than can readily be obtained by moistening the carborundum with sulfate-of-iron solution. The amount of sulfate of iron which can be introduced by the solution is limited, for after the addition of a certain percentage of the solution the mass becomes too wet to be readily molded. I therefore prefer to add the necessary proportion of iron in the form of a compound, such as peroxid of iron, which is mingled as a powder with the carborundum crystals, or I may add to the carborundum powdered ores or clay rich in oxid of iron.

In the manufacture of carborundum bricks and like articles I deem it desirable to make them of amorphous carborundum. I have found that iron and its compounds do not form a satisfactorily-efficient bond for the amorphous carborundum, and in order to utilize it for this purpose I incorporate with such amorphous carborundum a small amount of crystalline carborundum—say from two per cent. to ten per cent. of the latter, although the proportions used may be varied. I then proceed as above stated, adding sulfate-of-iron solution to the mingled mass of amorphous and crystallized carborundum and mold and burn the same. The action of the iron upon the crystalline material in the mass is sufficient to form a very efficient bond for the whole.

I claim—

1. The method herein described of bonding carborundum which consists in adding thereto a metallic compound adapted to combine with the carborundum and subjecting the same to heat.

2. The method herein described of bonding crystalline carborundum which consists in adding thereto an iron compound and subjecting the same to heat.

3. The method herein described of bonding crystalline carborundum, which consists in adding thereto sulfate of iron and subjecting the same to heat.

4. As a new article of manufacture, an article composed of mingled particles of crystalline and amorphous carborundum held by a bond containing iron.

In testimony whereof I have hereunto set my hand.

EDWARD GOODRICH ACHESON.

Witnesses:
FRANK J. TONE,
WILLIAM H. ARISON.